United States Patent [19]
Halmi

[11] 3,733,902
[45] May 22, 1973

[54] MINIMUM LENGTH HIGH QUALITY DIFFERENTIAL PRESSURE PRODUCING FLOW METER

[75] Inventor: Dezsoe Halmi, Cranston, R.I.

[73] Assignee: General Signal Corporation, Rochester, N.Y.

[22] Filed: Aug. 9, 1972

[21] Appl. No.: 279,154

Related U.S. Application Data

[63] Continuation-in-part of Ser. No. 144,898, May 19, 1971, abandoned.

[52] U.S. Cl. .......................................73/213, 138/44
[51] Int. Cl. ...................................................G01f 1/00
[58] Field of Search ..........................73/213; 138/44

[56] References Cited

UNITED STATES PATENTS

| | | | |
|---|---|---|---|
| 1,850,030 | 3/1932 | Pardoe | 73/213 |
| 2,704,555 | 3/1955 | Dall | 138/44 |
| 2,868,013 | 1/1959 | Terrell | 73/213 |

OTHER PUBLICATIONS

R. G. West, Rectangular Tube Design, Instrument Practice December 1961, p. 1547–1552

Primary Examiner—Richard C. Queisser
Assistant Examiner—John P. Beauchamp
Attorney—Jeffrey S. Mednick and Milton E. Kleinman

[57] ABSTRACT

The disclosure concerns fluid flow metering devices of the differential pressure producing type comprising a tube which defines a throat and a converging section for guiding fluid thereto from an inlet region of larger cross section. The tube has a special converging section which accelerates the fluid at two different rates and causes it to form two vena contractas before it reaches a true static pressure tap in the throat. The tube is designed in accordance with specified dimensional relationships which provide a tube of minimum length preferably having a discharge coefficient of 0.98 and a "2 sigma" accuracy tolerance between ±0.5 percent and ±1 percent depending upon whether the tube has a circular or a polygonal cross section.

10 Claims, 4 Drawing Figures

PATENTED MAY 22 1973

3,733,902

INVENTOR
DEZSOE HALMI

BY Dodge & Ostmann

ATTORNEYS

_3,733,902_

MINIMUM LENGTH HIGH QUALITY DIFFERENTIAL PRESSURE PRODUCING FLOW METER

CROSS-REFERENCE TO RELATED APPLICATION

This application is a continuation-in-part of U. S. application Ser. No. 144,898, filed May 19, 1971, now abandoned.

BACKGROUND AND SUMMARY OF THE INVENTION

Application Ser. No. 48,341, filed June 22, 1970, now U.S. Pat. No. 3,686,946, discloses a high quality flow meter of the differential pressure producing type which comprises a throat, and a converging section which guides fluid thereto from an inlet region of larger cross section. This instrument is characterized by internal geometry which causes the accelerating fluid to form one vena contracta in the converging section and a second vena contracta at the throat entrance, and by the use of a pressure tap in the throat which senses true static pressure at a point where the flow is attached to the tube wall. The tube, which has a circular cross section, affords a discharge coefficient on the order of 0.98, and "2 sigma" accuracy tolerances of ±0.5 percent and ±0.75 percent, respectively, for Beta ratios below and above 0.55. Application Ser. No. 144, 802, filed on May 19, 1971 now abandoned, extends these teachings and presents a high quality differential producer having a polygonal, normally rectangular, cross section which affords a closely comparable discharge coefficient and a "2 sigma" accuracy tolerance of ±1 percent over the whole range of useful Beta ratios (i.e., ratios between 0.75 and 0.3).

The object of the present invention is to provide minimum length versions of the high quality instruments disclosed in the aforementioned applications. The invention furnishes a set of empirically determined relationships which are valid for both circular and polygonal instruments, and which specify the minimum dimensions for the critical tube portions in terms of the cross sectional area of the inlet or the throat and the Beta ratio. The set includes the relationships required for the basic meter, which consists of the converging section, the throat and the throat tap, as well as the relationships needed for tubes of the flange ended type which include an inlet section containing a static pressure tap, and those which include a diffuser or head recovery section.

BRIEF DESCRIPTION OF THE DRAWING

Several embodiments of the invention are described herein with reference to the accompanying drawing in which.

DESCRIPTION OF ILLUSTRATED EMBODIMENTS

Figure 2:
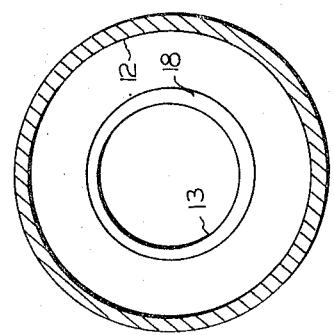
FIG. 2 is a sectional view taken on line 2—2 of FIG. 1.
Figure 1:
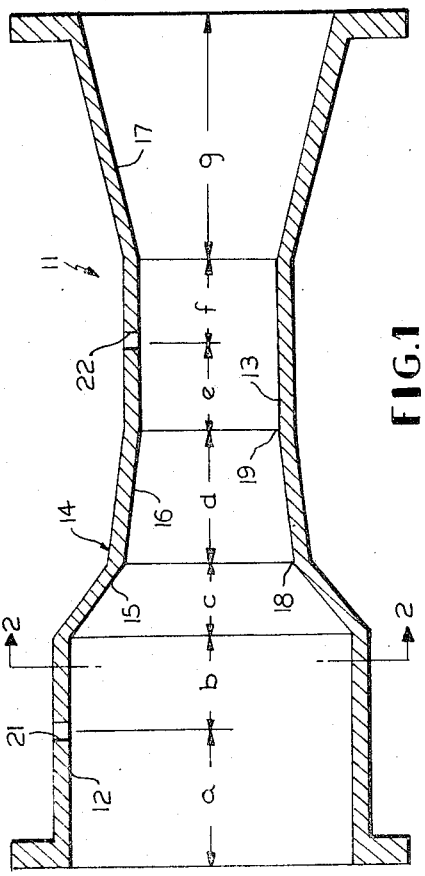
FIG. 1 is a horizontal, axial sectional view, in schematic form, of a flange ended tube having a circular cross section.

The embodiment of the invention shown in FIGS. 1 and 2 employs a tube 11 of circular cross section which includes cylindrical inlet and throat sections 12 and 13, respectively, a converging section 14 consisting of conical portions 15 and 16, and a conical diffuser 17. Conical portion 16 intersects portion 15 and throat 13 along continuous edges 18 and 19, respectively, therefore, as fluid flowing through tube 11 forms one vena contracta as it leaves portion 15, reattaches to the tube wall in portion 16, forms a second vena contracta as it leaves this portion, and then reattaches to the wall of throat 13. the upstream portion 15 of converging section 14 has the greater cone angle, so the vena contracta produced at edge 18 is more pronounced than the one produced at edge 19. As explained in application Ser. No. 48,341, now U.S. Pat. No. 3,686,946, these vena contractas normalize the flow pattern (i.e., the velocity distribution across the flowing stream), and thereby tend to make the discharge coefficient of tube 11 insensitive to changes in the design and condition of the upstream ducting.

Inlet and throat sections 12 and 13 are equipped with pressure taps 21 and 22 which are constructed in the conventional manner, but are positioned to sense the true static pressures in these sections. In other words, each tap senses pressure in a region where the flow is attached to the tube wall.

The axial dimensions $a$–$g$ shown in FIG. 1, for a "2 sigma" accuracy of ±0.5 percent, are determined from the following formulas, wherein $A_I$ and $A_T$ are the cross sectional areas of inlet and throat sections 12 and 13, respectively, and B is the Beta ratio of the tube (i.e., the ratio of the square roots of the cross sectional areas of the throat and the inlet):

$a$ = from approximately 1 inch to infinity
$b$ = from approximately 0.45 $\sqrt{A_I(B-0.31)}$ to approximately 1.5 $\sqrt{A_I(B-0.31)}$
$c$ = from approximately $\sqrt{A_I(0.67-0.76B)}$ to approximately 1.1 $\sqrt{A_I 0.67-0.76B)}$
$d$ = from approximately 0.5 $\sqrt{A_T}$ to approximately 0.6 $\sqrt{A_T}$
$e = f$ = from approximately 0.3 $\sqrt{A_T}$ to 0.9 $\sqrt{A_T}$
$g$ = up to 6 $\sqrt{A_I/0.78} - \sqrt{A_T/0.78}$ These formulas together with the cross sectional area of the tube at edge 18, which is determined from the expression 1.15 $A_T$, completely define the internal shape of tube 11, and result in a tube having the minimum length needed to achieve the superior performance described in application Ser. No. 48,341, now U.S. Pat. No. 3,686,946. Moreover, since all of the critical relationships are expressed in terms dependent upon line size and differential pressure requirements, the invention provides the optimum tube for any particular application which may be encountered.

For a "2 sigma" accuracy of ± 4.5 percent the following formulas are in order:

$a$ = from approximately 1 inch to infinity formulas are in order:
$a$ = from approximately 1 inch to infinity
$b$ = from approximately 0.28 $\sqrt{A_I(B-0.31)}$ to approximately 2.0 $\sqrt{A_I(B-0.31)}$
$c$ = from approximately 0.5 $\sqrt{A_I(0.67-.76B)}$ to approximately 2.0 $\sqrt{A_I(0.67-.76B)}$ $d$ = from approximately 0.3 $\sqrt{A_T}$ to approximately 0.9 $\sqrt{A_T}$ $e = f$ = from approximately 0.2 $\sqrt{A_T}$ to approximately 0.7 $\sqrt{A_T}$ $g$ = up to 6 ($\sqrt{A_I}/0.78 - \sqrt{A_T}/0.78$)

Figure 4:
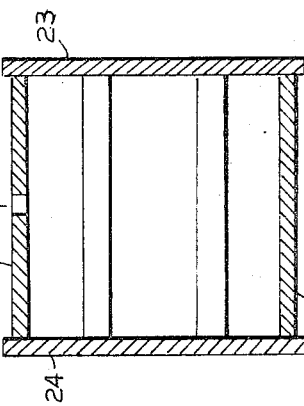
FIG. 4 is a sectional view taken on line 4—4 of FIG. 3.
Figure 3:
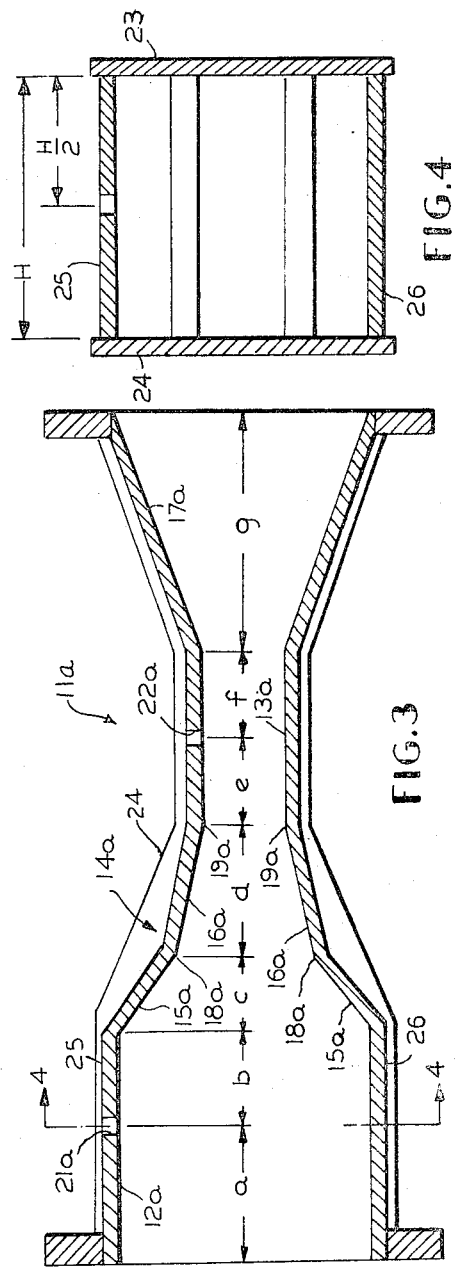
FIG. 3 is a horizontal, axial sectional view, in schematic form, of a flange ended tube having a rectangular cross section.

The embodiment shown in FIGS. 3 and 4 also is constructed in accordance with the formulas given above, but here the tube 11a has a rectangular cross section defined by upper and lower parallel walls 23 and 24, respectively, and a pair of identical, shaped side walls 25 and 26 which define inlet section 12a and throat 13a are parallel. Although, in the case of the first embodiment, the circumferential position of the taps 21 and 22 is immaterial, in the rectangular version it is necessary, for best results, to locate the tabs 21a and 22a in one of the shaped side walls 25 and 26, and to position them midway between the top and bottom walls (see FIG. 4). The performances of the two embodiments are closely comparable, but the rectangular tube 11a has a slightly larger "2 sigma" accuracy approximately 0.5 percent greater than that for a circular tube.

Either embodiment of the invention may take the form of an insert tube, in which case inlet section 12 or 12a is omitted, and the inlet tap 21 or 21a may be replaced by a corner tap. However, since the insert type of tube does not perform as well as the flange ended type, it is not recommended for applications where precise flow measurements are required. In applications where head recovery is not important, the diffuser 17 or 17a may be omitted without adversely affecting the metering accuracy of the tube.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A flow metering device of the differential pressure producing type comprising
   a. a tube which defines a throat and a converging section which guides fluid thereto from an inlet region of larger cross section,
   b. the converging section having adjoining upstream and downstream portions which accelerate the fluid at different rates and each of which has an edge at its exit end which causes the fluid to form a vena contracta,
   c. the axial length of the upstream portion being between 0.5 $\sqrt{A_I}(0.67-0.76B)$ and 2.0 $\sqrt{A_I}(0.67-0.76B)$ and the axial length of the downstream portion being between 0.3 $\sqrt{A_T}$ and 0.9 $\sqrt{A_T}$, and the axial length of the throat being between 0.4 $\sqrt{A_T}$ and 1.4 $\sqrt{A_T}$, where $A_I$ and $A_T$ are the cross sectional areas of the inlet region and the throat, respectively, and B is the Beta ratio of the tube; and
   d. a true static pressure tap located in the middle of the throat.

2. A flow metering device as defined in claim 1 in which the axial length of the upstream portion is between $\sqrt{A_I}(0.67-0.76B)$ and 1.1 $\sqrt{A_I}(0.67-0.76B)$ and the axial length of the downstream portion is between 0.5 $\sqrt{A_T}$ and 0.6 $\sqrt{A_T}$.

3. A flow metering device as defined in claim 2 in which
   a. the tube also defines an inlet section which is joined to the throat by the converging section; and
   b. the inlet section contains a true static pressure tap spaced axially from the entrance of the converging section a distance between 0.28 $\sqrt{A_I}(B-0.31)$ and 2.0 $\sqrt{A_I}(B-0.31)$.

4. A flow metering device as defined in claim 3 in which the tap is at least 1 inch from the entrance of the inlet section.

5. A flow metering device as defined in claim 1 in which the tube also defines a diffuser joined to the exit end of the throat and having an axial length up to (6 $\sqrt{A_I}/0.78 - \sqrt{A_T}/0.78$).

6. A flow metering device as defined in claim 3 in which the tube also defines a diffuser joined to the exit end of the throat and having an axial length up to (6 $\sqrt{A_I}/0.78 - \sqrt{A_T}/0.78$).

7. A flow metering device as defined in claim 4 in which the tube also defines a diffuser joined to the exit end of the throat and having an axial length up to (6 $\sqrt{A_I}/0.78 - \sqrt{A_T}/0.78$).

8. A flow metering device as defined in claim 7 in which
   a. the tube has a circular cross section;
   b. the inlet section and the throat are cylindrical; and
   c. the two portions of the converging section and the diffuser are conical.

9. A flow metering device as defined in claim 7 in which
   a. the tube has a rectangular cross section; and
   b. each of the taps is located in a tube wall having a portion in the converging section which changes direction of flow.

10. A flow metering device as defined in claim 9 in which
    a. the tube comprises two parallel walls and two shaped walls; and
    b. the taps are located in one of the shaped walls.

* * * * *

UNITED STATES PATENT OFFICE
CERTIFICATE OF CORRECTION

Patent No. 3,733,902      Dated May 22, 1973

Inventor(s) Dezsoe Halmi

It is certified that error appears in the above-identified patent and that said Letters Patent are hereby corrected as shown below:

On column 2, cancel lines 44-47 and substitute the following therefor:

$d =$ from approximately $0.5 \sqrt{A_T}$ to approximately $0.6 \sqrt{A_T}$ $e = f =$ from approximately $0.3 \sqrt{A_T}$ to approximately $0.9 \sqrt{A_T}$ $g =$ up to $6 ( \sqrt{A_I\ 0.78} - \sqrt{A_T\ 0.78} )$ --

On column 2, lines 66 and 67 (two occurrences), replace " $\sqrt{A_I(0.67-0.76B)}$ " with -- $\sqrt{A_I}\ (0.67-0.76B)$ --.

On column 3, line 5, replace

" $6\sqrt{\frac{A_I}{0.78}} - \sqrt{\frac{A_T}{0.78}}$ " with -- $6 ( \sqrt{\frac{A_I}{0.78}} - \sqrt{\frac{A_T}{0.78}} )$ --.

UNITED STATES PATENT OFFICE
CERTIFICATE OF CORRECTION

Patent No. 3,733,902  Dated May 22, 1973

Inventor(s) Dezsoe Halmi

It is certified that error appears in the above-identified patent and that said Letters Patent are hereby corrected as shown below:

In column 4, lines 26 and 27, 30 and 31, and 34 and 35 each occurrence replace

" $\left( 6 \sqrt{\dfrac{A_I}{0.78}} - \sqrt{\dfrac{A_T}{0.78}} \right)$ " with -- $6 \left( \sqrt{\dfrac{A_I}{0.78}} - \sqrt{\dfrac{A_T}{0.78}} \right)$ --.

Signed and sealed this 26th day of February 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,733,902      Dated May 22, 1973

Inventor(s)  Dezsoe Halmi

It is certified that error appears in the above-identified patent and that said Letters Patent are hereby corrected as shown below:

Column 2, lines 42 and 43 should appear as shown below:

$c =$ from approximately $\sqrt{A_I}$ (0.67-0.76B) to approximately 1.1 $\sqrt{A_I}$ (0.67-0.76B)

Signed and sealed this 20th day of August 1974.

(SEAL)
Attest:

McCOY M. GIBSON, JR.       C. MARSHALL DANN
Attesting Officer          Commissioner of Patents